United States Patent [19]

Sasaki et al.

[11] Patent Number: 4,469,747

[45] Date of Patent: Sep. 4, 1984

[54] DIELECTRIC FILMS AND PROCESS FOR PREPARING SAME

[75] Inventors: Tohru Sasaki; Syuuzi Terasaki; Tomoo Susa, all of Iwaki, Japan

[73] Assignee: Kureha Kagaku Kogyo Kabushiki Kaisha, Tokyo, Japan

[21] Appl. No.: 347,639

[22] Filed: Feb. 10, 1982

[51] Int. Cl.³ .................. B32B 5/16; B32B 27/00; B29C 17/02
[52] U.S. Cl. .................. 428/325; 428/334; 428/408; 428/421; 428/441; 428/910; 428/412; 428/477.7; 428/475.2; 428/476.3; 428/476.9; 428/483; 428/480; 428/518; 501/137; 264/176 R
[58] Field of Search .............. 428/325, 334, 408, 421, 428/441, 910; 264/176 R

[56] References Cited

U.S. PATENT DOCUMENTS

| | | | |
|---|---|---|---|
| 3,551,197 | 12/1970 | Lindquist, Jr. | 428/325 |
| 3,865,626 | 2/1975 | Diener et al. | 428/408 |
| 4,241,128 | 12/1980 | Wang | 428/421 X |
| 4,298,719 | 11/1981 | Mizuno et al. | 428/421 X |
| 4,303,720 | 12/1981 | Clough | 428/513 X |

FOREIGN PATENT DOCUMENTS 2044 1/1980 Japan .

*Primary Examiner*—Patricia C. Ives
*Attorney, Agent, or Firm*—Woodcock, Washburn, Kurtz, Mackiewicz & Norris

[57] ABSTRACT

The dielectric film contains from 40 to 97% by volume of a thermoplastic resin, from 2 to 50% by volume of a ceramic dielectric and from 1 to 25% by volume of carbon black. The composite film contain a base film layer composed of said dielectric film and the dielectric film of the thermoplastic resin provided on at least one surface thereof.

30 Claims, 3 Drawing Figures

FIG. I
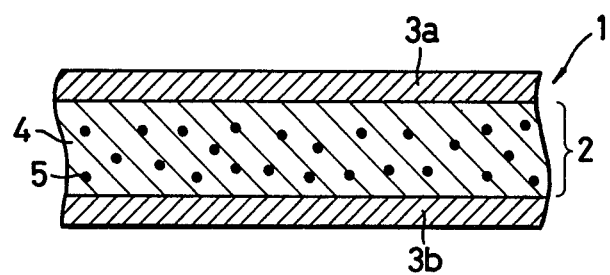
FIG. 2
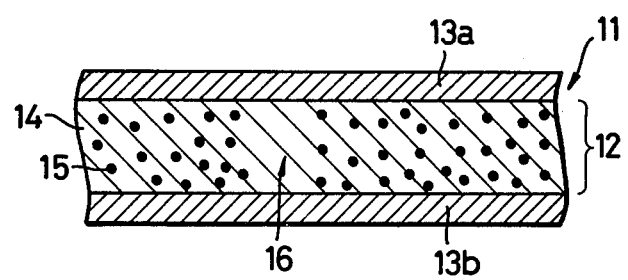
FIG. 3
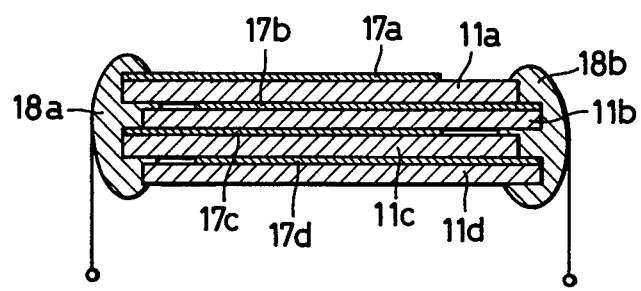

DIELECTRIC FILMS AND PROCESS FOR PREPARING SAME

BACKGROUND OF THE INVENTION

1. Field of the Invention

The present invention reltes to a dielectric film, a laminated film using the same, and a process for preparing the same.

2. Brief Description of the Prior Art

A conventional dielectric film having a high dielectric constant is one formed from a mixture of a ceramic dielectric with a high dielectric constant and a polymer. Where an amount of the high dielectric ceramics is increased, processability of the dielectric film resulting therefrom is impaired. Where the amount thereof is rendered small, the dielectric constant of the resulting dielectric film is decreased.

As a conventional dielectric body having a high dielectric constant has a high dielectric dissipation factor, tan δ, there is known yet no dielectric film having a combination of properties such as high dielectric constant, low AC loss, good processability and uniform composition.

A conventional dielectric film employing a polymer as a matrix material presents various problems. For example, it is known that a capacitor or a capacitive switch which results from a film of a thermoplastic resin such as polyolefin, thermoplastic polyester, polyamide, polycarbonate, polyvinyl fluoride, polyvinylidene fluoride, polytetrafluoroethylene or polyvinyl chloride possesses an electrostatic capacity that is in proportion to a dielectric constant of the film and in inverse proportion to a thickness of the film. Although it is preferred that the thickness of the film is as thin as possible, there is a limitation of rendering the film thinner. For example, a thermoplastic polyester film having the thickness of 2 microns and a high Young's modulus is commercially available; however, it is very difficult to form a film having a thickness of less than 3 microns from the other resins on an industrial scale. If a film which is formed from a material having a Young's modulus far smaller than that of a film of polyester such as polyvinylidene fluoride or polypropylene is wound on itself in roll, a stress resulting from winding without causing wrinkles may sometimes exceed the critical stress of the elastic limit of the film. This will encounter the difficulty with respect to the preparation of a capacitor from such film roll. Such conventional film will also give rise to the difficulty in increasing an electrostatic capacity of the capacitor so that the resulting capacitor cannot be rendered thinner.

Japanese Patent Publication No. 2,044/1980 discloses a composition comprising polyvinylidene fluoride and carbon black. This composition permits a large variation in dielectric constant with a slight change in an amount of carbon black. It has the tendency that carbon black decomposes upon application of a high shear during milling, resulting in a variation in dielectric constant even when carbon black is mixed in identical amounts. With such composition, it is difficult to form films having a uniform thickness on an industrial scale. Where the amount of carbon black is rendered too large, such composition has the tendency that the dissipation factor, tan δ, becomes extremely low.

OBJECTS AND SUMMARY OF THE INVENTION

Therefore, the primary object of the present invention is to provide a dielectric film having a high dielectric constant and a good processability.

Another object of the present invention is to provide a dielectric film further having a low AC loss and a uniform composition.

A further object of the present invention is to provide a dielectric film resulting from a film material which has a thickness suitable for processability during manufacture and which can form a capacitor or the like which a high electrostatic capacity per unit surface area.

The dielectric film in accordance with one aspect of the present invention comprises a dielectric film containing a thermoplastic resin in an amount ranging from about 40 to 97% by volume, a ceramic dielectric in an amount ranging from about 2 to 50% by volume and carbon black in an amount ranging from about 1 to 25% by volume.

The dielectric film in accordance with another aspect of the present invention comprises the dielectric film laminated on one or both surfaces of a base film.

BRIEF DESCRIPTION OF THE DRAWINGS

FIG. 1 is a cross sectional view illustrating an embodiment of a composite film in accordance with the present invention.

FIG. 2 is a cross sectional view illustrating another embodiment of a composite film in accordance with the present invention.

FIG. 3 is a cross sectional view illustrating a capacitor resulting from the laminated filma using the composite films as shown in FIG. 2.

DETAILED DESCRIPTION OF THE PREFERRED EMBODIMENTS

The dielectric film in accordance with the present invention comprises a thermoplastic resin, a ceramic dielectric and carbon black.

As the thermoplastic resin for the composition to be used for the present invention, a known thermoplastic resin may be used. The thermoplastic resins may include non-polar or polar thermoplastic resins. Representatives of the non-polar thermoplastic resins may include polyethylene (hereinafter referred to as PE) and polypropylene (hereinafter referred to as PP), and representatives of the polar ones may include a polyvinylidene fluoride resin such as, for example, a polyvinylidene fluoride homopolymer (hereinafter referred to as PVDF) or a polyvinylidene fluoride copolymer obtainable by the copolymerization of more than about 50 mol% of the vinylidene fluoride with a copolymerizable monomer such as a fluoride-containing compound, e.g., vinyl fluoride, vinylidene fluoride, ethylene chlorofluoride, ethylene tetrafluoride or propylene hexafluoride. Among these resins, polyvinylidene fluoride resin, polyvinyl fluoride and polytrifluoroethylene that have each a high dielectric constant are preferably used. In order to impart a particularly high dielectric constant to the resulting film, it is preferred to use the polar thermoplastic resin having a relative dielectric constant at 1 KHz of preferably larger than about 6, more preferably larger than about 8.

The amount of the thermoplastic resin in the composition to be used in the invention may be in the range generally from about 40 to 97% by volume, preferably from about 45 to 95% by volume and, more preferably, from about 50 to 93% by volume. Where the amount of the thermoplastic resin is too small, processability may be impaired. Where the amount thereof becomes too much, the dielectric constant of a dielectric film resulting therefrom may be rendered smaller.

As carbon black to be dispersed in the thermoplastic resin, it is preferable to use a longer chain of carbon black particles (generally called "structure") which gather with each other in clusters. Whether the structure is long or short is determined by whether an oil absorption of carbon black used is large or small. In general, carbon black having a larger oil absorption may impart a higher dielectric constant to the film. In order to improve a dielectric constant by the addition of a small amount of carbon black, it is preferred to use such carbon black as having an oil absorption larger than about 100 cc per 100 grams. In order to minimize a variation in dielectric constant with a slight change of amounts of carbon black, it is rather preferred to use carbon black having a small oil absorption.

The amount of carbon black in the composition to be used in the present invention may be in the range generally from about 1 to 25% by volume, preferably from about 2 to 20% by volume and, more preferably, from about 3 to 15% by volume. A larger amount of carbon black will impair molding characteristics. A smaller amount thereof will decrease a dielectric constant of the film.

The ceramic dielectric that is dispersed in the composition in accordance with the present invention may include, for example, a ferroelectric such as ceramics of the $BaTiO_3$ ceramic type, of the lead titanozirconate type or of the niobic acid type or the like or a ceramic paraelectric material such as titanium oxide, alumina or the like. It is preferable to use a dielectric having a relative dielectric constant of more than about 10, more preferably, more than about 50 at 1 KHz because such dielectric will provide a higher dielectric constant.

The amount of the ceramic dielectric in the composition may be in the amount ranging preferably from about 2 to 50% by volume, more preferably from about 5 to 45% by volume and, particularly preferably from about 10 to 40% by volume. Where the amount of the ceramic dielectric is rendered too large, processability becomes impaired.

In accordance with the present invention, a size of the ceramic dielectric is not restricted to a particular one. Where the size of the dielectric is rendered smaller, voids are formed to a lesser extent when the film is oriented. The use of the ceramic dielectric having a smaller size, however, may present the disadvantages that a homogeneous admixture becomes difficult upon extrusion processing and flexibility is rendered relatively small. Accordingly, the size of the ceramic to be used may be appropriately chosen in accordance with an intended use.

The composition to be used in the present invention may contain another constituent such as a dispersion aid. The composition comprising the thermoplastic resin, the ceramic dielectric and carbon black can provide a dielectric constant indicating the same tan δ, that is about several tens times that of the composition comprising the thermoplastic resin and carbon black.

The dielectric film in accordance with the present invention may be of the type that is formed by a single use of the three-component composition as hereinabove set forth or by laminating a dielectric film on a base film.

Where the dielectric film in accordance with the present invention comprises a one-layer structure, it contains the thermoplastic resin in the amount ranging from about 40 to 97% by volume, preferably from about 45 to 95% by volume and more preferably from about 50 to 93% by volume; the ceramic dielectric in the amount ranging preferably from about 2 to 50% by volume and more preferably from about 5 to 45% by volume; and carbon black in the amount ranging from about 1 to 25% by volume, preferably from about 2 to 20% by volume and more preferably from about 3 to 15% by volume. Such dielectric film may be prepared in conventional manner, for example, merely by extruding the composition comprising the three components through an extruder to a film having a desired thickness and, when necessary, then orienting the film in a uniaxial or biaxial direction.

Where the dielectric film in accordance with the present invention comprises a plural-layer structure, the film may be of the type that is called "a composite film", that is to say, that is formed by laminating a dielectric layer on at least one surface of a base film.

In the embodiments of the invention as shown in FIGS. 1 and 2, the composite films 1 and 11 are seen, respectively, to comprise the base films 2 and 12 and the dielectric layers 3a, 3b and 13a, 13b laminated on the both respective surfaces of the base films. In FIGS. 1 and 2, the reference numerals 4 and 14 means the thermoplastic resin, and the reference numerals 5 and 15 mean carbon black. The base films may be prepared from the composition as hereinabove mentioned, that is, the homogeneous composition comprising the thermoplastic resin in the amount ranging from about 40 to 97% by volume, preferably from about 45 to 95% by volume and more preferably from about 50 to 93% by volume; the ceramic dielectric in the amount ranging generally from about 2 to 50% by volume and preferably from about 5 to 45% by volume; and carbon black in the amount ranging from about 1 to 25% by volume, preferably from about 2 to 20% by volume and more preferably from about 3 to 15% by volume.

Referring to FIG. 2, the composite film in accordance with the present invention may be provided in the base film 12 with linear portions 16 where no carbon black is dispersed. The provision of such portions is preferred because the portions serve as portions that can electrically isolate the adjacent portions where carbon black and the ceramic dielectric are homogeneously dispersed. The width of the linear portions 16 may be preferably in the range from about 0.1 to 5 mm.

In accordance with the present invention, the composite films 1 and 11 may be prepared, for example, by concurrently extruding the base films 2 and 12 and the dielectric layer or layers 3a, 3b and 13a, 13b, respectively, in a uniaxial or biaxial direction. The materials to be used for the dielectric layers may be suitably chosen such that the resulting dielectric layer or layers are bonded by themselves to the base film to a sufficient extent. Where the materials for either or both of the base film and the dielectric layer or layers do not adhere to each other, it is possible to use an adhesive; however, the use of an adhesive leads to the provision of an additional dielectric layer, resulting in an increase in an overall thickness of the composite film and giving rise to a decrease in the average dielectric constant of the overall dielectric layer or layers. The materials for the dielectric layers may be a thermoplastic resin identical to those enumerated hereinabove for the base film and preferably of the type that has a high dielectric constant as, for example, a relative dielectric constant of higher than about 10. Such resins may preferably include, for example, a fluorine-containing resin such as polyvinylidene fluoride, polyvinyl fluoride and polytrifluoroethylene. The use of the resins having a high dielectric constant is also advantageous for the purpose to increase an electrostatic capacity of the composite film. The dielectric layer or layers may contain a ceramic dielectric, a dispersing aid, a small amount of carbon black and any other additives. Among those additives, the ceramic dielectric may be preferably employed to increase an electrostatic capacity of the dielectric layer or layers, resulting in an increase of the electrostatic capacity of the resulting composite film. The ceramic dielectrics to be used for this purpose may be the same as enumerated hereinabove for the base film. In instances, however, where the dielectric layer or layers are rendered thick, the employment of finely divided particles or powders inadmixible with the resins, such as ceramics, may well be avoided because such powders will cause a decrease in a volume resistivity. Although the thickness of the dielectric layer is not restricted to a particular one, it may be generally less than about 5 microns and preferably less than about 3 microns. The thickness of the dielectric layer may also be generally about less than 2 times, preferably equal to and, more preferably, from about ½ to 1/50 times, the thickness of the base film. The overall thickness of the composite film may range generally from about 2 to 200 microns and preferably from about 4 to 100 microns although it may be chosen in arbitrary manner. The dielectric film comprising the base film and the dielectric layers disposed on at least one surface thereof obtainable by the concurrent drawing technique may be co-drawn up to 1/10 or less of the thickness of a film obtainable by separating extruding the base film and the dielectric layer or layers to form a composite film and then drawing the composite film together. The composite film may also be prepared by pressing or casting.

Turning back to FIG. 1, for example, a ratio in thickness of the base film 2 to the dielectric layers 3a and 3b may be arbitrarily chosen, although a too large ratio is not preferred because the effect to be otherwise expected by the composition is decreased. Generally, the thicknesses of the dielectric layers 3a and 3b may be each in the range preferably lower than 5 microns, more preferably lower than 3 microns and further below 2 times the thickness of the base film 2, preferably below the same thickness thereof and, more preferably, in the range from ½ to 1/50. Although the thickness of the composite film 1 as a whole may be chosen within an arbitrary scope, it may be in the range generally from 2 to 200 microns, preferably from 4 to 100 microns.

The composite film 1 in accordance with the present invention may be provided at its one side or both sides with a thin electrode by means of deposition, sputtering or any other suitable techniques and may be used as a dielectric material for a film capacitor such as a laminated capacitor or a roll capacitor or a capacitive switch.

Referring now to FIG. 3, a capacitor resulting from the laminated films in accordance with the present invention is seen to comprise the composite films (generally referred to as 11) in accordance with the present invention with the electrode (generally referred to as 17) deposed thereon. In FIG. 3, the thicknesses of the film 11 and, in particular, the electrode 17 are exaggerated for convenience in drawing the figure. In the capacitor as shown in FIG. 3, the Metallikon (registered trade mark) joints 18a and 18b are isolated from the electrodes 17a and 17b, respectively, so that, even when the joints are brought into contact with the respective side portions of the composite films 11a and 11b, there is no risk that circuitry between the electrodes 17a and 17b is caused to be formed. It is preferred to provide the linear portions 16 having no carbon black at portions that are in contact with the Metallikon (registered trade mark) joints 18a and 18b.

Where a capacitor is formed by laminating the composite film 1 with one dielectric layer 3a laminated thereon, the electrostatic capacity $C_1$ of the base film layer 2 and the electrostatic capacity $C_2$ of the dielectric layer 3a are represented respectively as follows:

$$C_1 = \epsilon_1 S/t_1 \tag{1}$$

$$C_2 = \epsilon_2 S/t_2 \tag{2}$$

where $\epsilon_1$ and $\epsilon_2$ are each a dielectric constant of the respective layers; $t_1$ and $t_2$ are each a thickness thereof; and S is an area of the film. Thus, the whole electrostatic capacity C of the composite film 1 is:

$$1/C = 1/C_1 + 1/C_2 = t_1/\epsilon_1 S + t_2/\epsilon_2 S \tag{3}$$

Therefore, if the amount of carbon black 5 in the base film 2 would increase and the dielectric constant $\epsilon_1$ of the base film comes up to infinity, the electrostatic capacity C becomes almost equal to $C_2$, that is, $C = C_2$.

Where the base film layer 2 is provided at its both surfaces with the dielectric layers 3a and 3b, the electrostatic capacity $C_2$ and $C_3$ of the dielectric layers 3a and 3b, respectively, are likewise represented as follows:

$$1/C = 1/C_1 + 1/C_2 + 1/C_3 = 1/C_2 + 1/C_3 \tag{4}$$

$$C = C_2 C_3/(C_2 + C_3) \tag{5}$$

If the dielectric layers 3a and 3b are formed from the identical resins and in the same thicknesses, $C_2$ becomes equal to $C_3$. Thus $C = C_2/2$.

From the foregoing, even when the dielectric constant $\epsilon_1$ of the base film 2 nears to infinity and where $t_1/\epsilon_1$ is substantially smaller than $t_2/\epsilon_2$, that is, $\epsilon_2/\epsilon_1$ is sufficiently small with respect to $t_2/t_1$, a contribution of $C_1$ to C becomes small. Thus, the effect of a thinner thickness of the dielectric layer 3a is produced to an appreciably great extent. For example, when $t_2/t_1 = 1/10$ and $\epsilon_2/\epsilon_1 = 1/100$, the first term of the right member in equation (3) is 1/100 of the second term of the right member. When $\epsilon_2/\epsilon_1$ is 1/1,000, the first term of the member in equation (3) is 1/100 of the second term of the right member. The base film 2 comprises the thermoplastic resin layer containing carbon black 5 and can be oriented with the dielectric layers 3a and/or 3b formed on the surface or surfaces thereof so that the thicknesses of the dielectric layers 3a and/or 3b may be decreased to about one several tenths through 1/10 or less by orientation, thicknesses of the layers and the orientation ratio may be suitably selected. A mere concurrent extrusion without orientation may also give the composite film 1.

EXAMPLES 1-15 AND COMPARATIVE EXAMPLES 1-17

A mixture comprising a thermoplastic resin, a ceramic and carbon black as listed in Table 1 below was blended with a mixture. The thermoplastic resin included PVDF, PP and PE. The ceramic included BaTiO$_3$ powders (Designation: Kyolix Ceramic Powder ZU-60B; Kyoritsu Yogyo Genryo K.K.; a relative dielectric constant at 1 KHz, 10,000; tan δ, 2.5%) and titanium dioxide TiO$_2$ (Designation: Rf-101; E. I. duPont de Nemours & Co.). Carbon black included one sold under designation "Neo Spectra Mark II" and manufactured by Columbian Carbon Nippon K.K. If necessary, a titanate series coupling agent (Designation: Plainact-TTS; manufactured by Ajinomoto K.K.) was used in the amount of 3 parts by weight per 100 parts by weight of the aforesaid three constituents. The resulting mixture was then mixed for 15 minutes with a mixing roll having a roll space of 0.1 mm and a roll surface temperature of 170° C., and the resulting roll sheet was then formed into a press sheet having a thickness of 100 microns by passing through ferroplates at a temperature of 220° C. under a pressure of 150 kg/cm$^2$. The press sheet was subjected to deposition and provided at its both surfaces with an aluminum layer as an electrode. The resulting sheet was measured for its relative dielectric constant and tan δ at 25° C. and 1 KHz by means of an alternating current bridge method. The film was then formed in a sheet having the thickness of 200 microns, the width of 20 mm and the length of 50 mm and which was measured for its flexibility by bending the sheet at an angle of 180°. The results are shown in Table 1.

EXAMPLE 16

A biaxially drawn PVDF film having a thickness of 9 microns and a relative dielectric constant at 1 KHz of 10.7 was bonded to one surface of the press sheet of Example 4 at a press temperature of 175° C. under a press pressure of 50 kg/cm$^2$ in such a manner that no air was present between the bonded surfaces. The film was then deposited on its both surfaces with Al films as electrodes by means of the vacuum deposition technique. The dielectric film thus prepared was formed to have a relative dielectric constant at 1 KHz of 110 at 25° C. when measured in the same manner as in Example 4. Its volume resistivity was $1.2 \times 10^{14}$ ohms-cm at 25° C. in one minute after a direct current of 100 volts were applied. The insulation breakdown in accordance with the Specification JIS 2138 was 110 KV/mm.

TABLE 1

| | Composition (% by vol.) | | | | | Coupling Agent | Characteristics | | |
|---|---|---|---|---|---|---|---|---|---|
| | Resin | Ceramics | Carbon Black | Kinds of Resins | Kinds of Ceramics | | Relative Dielectric Constant | tan δ (%) | Flexibility |
| Example 1 | 71 | 25 | 4 | PVDF | BaTiO$_2$ | None | 150 | 4 | Good |
| Example 2 | 70 | " | 5 | " | " | " | 300 | 6 | " |
| Example 3 | 69 | " | 6 | " | " | " | 850 | 7 | " |
| Example 4 | 68 | " | 7 | " | " | " | 5,000 | 10 | " |
| Example 5 | 66 | " | 9 | " | " | Used | 15,000 | 17 | " |
| Example 6 | 52 | 36 | 12 | " | " | " | 80,000 | 31 | " |
| Example 7 | 54 | 43 | 3 | " | " | " | 64 | 2 | " |
| Example 8 | 90 | 3 | 7 | " | " | None | 740 | 18 | " |
| Example 9 | 81 | 5 | 12 | " | " | " | 40,000 | 22 | " |
| Example 10 | 78 | 10 | 14 | " | " | " | 45,000 | 25 | " |
| Example 11 | 68 | 25 | 7 | PP | " | Used | 3,000 | 15 | " |
| Example 12 | 64 | 30 | 6 | PVDF | TiO$_2$ | " | 250 | 18 | " |
| Example 13 | 53 | 46 | 1 | " | BaTiO$_2$ | " | 36 | 2.8 | " |
| Example 14 | 68 | 25 | 7 | PE | " | " | 3,000 | 15 | " |
| Example 15 | 65 | 30 | 5 | PVDF | " | " | 350 | 6 | " |
| Comparative Example 1 | 100 | 0 | 0 | PVDF | — | None | 10 | 2 | Good |
| Comparative Example 2 | 40 | 60 | 0 | " | BaTiO$_2$ | Used | 75 | 2 | None |
| Comparative Example 3 | 97 | 0 | 3 | " | — | None | 17 | 3 | Good |
| Comparative Example 4 | 96 | 0 | 4 | " | — | " | 23 | 4.5 | " |
| Comparative Example 5 | 94 | 0 | 6 | " | — | " | 80 | 10 | " |
| Comparative Example 6 | 93 | 0 | 7 | " | — | " | 600 | 28 | " |
| Comparative Example 7 | 91 | 0 | 9 | " | — | " | 1,800 | 40 | " |
| Comparative Example 8 | 89 | 0 | 11 | " | — | " | 9,600 | 65 | " |
| Comparative Example 9 | 80 | 20 | 0 | " | BaTiO$_2$ | " | 22 | 2 | " |
| Comparative Example 10 | 75 | 25 | 0 | " | " | " | 23 | 2 | " |
| Comparative Example 11 | 70 | 30 | 0 | PVDF | BaTiO$_2$ | None | 26 | 2 | Good |
| Comparative Example 12 | 60 | 40 | 0 | " | " | Used | 36 | 2 | " |
| Comparative Example 13 | 50 | 50 | 0 | " | " | " | 60 | 2 | Poor |
| Comparative Example 14 | 75 | 25 | 0 | PP | " | " | 3 | 1.3 | Good |
| Comparative Example 15 | 96 | 0 | 4 | " | — | " | 8 | 5 | " |

TABLE 1-continued

| | Composition (% by vol.) | | | Kinds of Resins | Kinds of Ceramics | Coupling Agent | Characteristics | | |
|---|---|---|---|---|---|---|---|---|---|
| | Resin | Ceramics | Carbon Black | | | | Relative Dielectric Constant | tan δ (%) | Flexibility |
| Comparative Example 16 | 70 | 30 | 0 | PVDF | TiO$_2$ | " | 20 | 3.7 | Poor |
| Comparative Example 17 | 55 | 45 | 0 | " | " | " | 27 | 4.1 | Poor |

EXAMPLE 17

A biaxially drawn PVDF film having a thickness of 9 microns was bonded to the both surfaces of the press sheet of Example 5 under the same press conditions as used in Example 16 to give a three-layer dielectric body. The dielectric body was then measured for its dielectric constant and volume resistance by the same methods as used in Example 16 and gave 75 and $2.2 \times 10^{14}$ ohms-cm, respectively. The insulation breakdown voltage thereof measured in accordance with the designation JIS 2318 was 150 KV/mm.

EXAMPLE 18

The three-layer dielectric body of Example 17 was oriented in one axial direction three times its length at an orientation speed of 10% per minute to give a film having a thickness of 30 microns. The relative dielectric constant and the volume resistivity of the resulting film were 48 and $2.5 \times 10^{14}$ ohms-cm, respectively.

EXAMPLE 19

A blend was obtained by adding carbon black (furnace black) in the amount of 8% by volume to PVDF as a resin for the base film and then subjected to melt extrusion so as to disperse the carbon black uniformly to give pellets.

The dielectric layer was laminated on the both surfaces of the base film prepared hereinabove by coextruding the PVDF pellets at a temperature of 240° C. The resulting film was then oriented in a lengthwise direction under drawing conditions as mentioned in Table 2 below.

The thickness of the base film and the dielectric layers disposed on the both surfaces thereof after concurrent orientation were found as shown in Table 2 below provided that the thicknesses of the two dielectric layers were identical to each other.

An aluminum layer was deposited on the both surfaces of the resulting sheet. The relative dielectric constant at 1 KHz and tan δ of the resulting deposited sheet were found as shown in Table 2 below. The volume resistivity was also measured by applying a direct current of 100 volts thereto. The results are shown in Table 2. In Table 2 below, and electrostatic capacity per unit surface area of the capacitor resulting therefrom is also shown.

COMPARATIVE EXAMPLES 18–19

The material for either of the base film (Comparative Example 18) and the dielectric layer (Comparative Example 19) as used in EXAMPLE 19 was extruded at 240° C. and then drawn by 2.5 times the original length at 130° C. The film was then treated in the same manner as in Example 19 to give to specimen. Its performance is shown in Table 2 below.

EXAMPLE 20

The uniaxially oriented film of Example 21-2 was oriented 4.5 times the original length in the lengthwise direction at a temperature of 170° C. to give a biaxially oriented film having a thickness of 13.5 microns. The relative dielectric constant, tan δ and volume resistivity after 1 minute when a direct current of 10 volts was applied were 55, 0.02 and $13 \times 10^{14}$ ohms-cm, respectively.

TABLE 2

| | Drawing Temp (°C.) | Drawing Rate (times) | Thickness of Base Film (μ) | Thickness of Dielectric Layer (μ) | Relative Dielectric Constant | tan δ | Volume Resistivity (ohm-cm) | Electrostatic Capacity per Unit Surface Area (μF/sq.m.) |
|---|---|---|---|---|---|---|---|---|
| Example 21-1 | 140 | 3.0 | 45 | 2.5 | 103 | 0.021 | $5.2 \times 10^{13}$ | 18 |
| Example 21-2 | 145 | 2.5 | 48 | 6.0 | 58 | 0.020 | $1.3 \times 10^{14}$ | 8.5 |
| Example 21-3 | 150 | 2.5 | 42 | 9.0 | 43 | 0.020 | $1.8 \times 10^{14}$ | 6.3 |
| Example 21-4 | 130 | 2.5 | 30 | 15.0 | 25 | 0.019 | $3.3 \times 10^{14}$ | 3.7 |
| Example 21-5 | 145 | 3.0 | 17 | 1.7 | 72 | 0.021 | $9.5 \times 10^{13}$ | 31.3 |
| Comparative Example 18 | 130 | 2.5 | 60 | — | 20,000 | 0.13 | Inmeasurable | 2,950 |
| Comparative Example 19 | 130 | 2.5 | — | 60.0 | 11 | 0.015 | $1.1 \times 10^{15}$ | 1.6 |

EXAMPLE 21

The uniaxially oriented film was further oriented 4.6 times its original length in the widthwise direction at 168° C. to give a biaxially oriented film having a thickness of 4.5 microns.

The relative dielectric constant, tan δ and volume resistivity after 1 minute when a direct current of 10 volts were applied were respectively 70, 0.021 and $1.0 \times 10^{14}$ ohms-cm.

EXAMPLE 22

A dielectric layer comprising a uniform dispersion of BaTiO$_3$ in PVDF in the amount of 20% by volume was laminated on the both surfaces of a core layer comprising a base film resin used in Example 19 by concurrently extruding the resins at 250° C. and then oriented 3.0 times its original length uniaxially in the lengthwise direction to give a laminated film having a thickness of 60 microns with each of the dielectric layers having a thickness of 3.3 microns. The relative dielectric constant, tan δ and volume resistivity of the resulting film after 1 minute when a direct current of 100 volts were applied were respectively 290, 0.027 and $1.2 \times 10^{13}$ ohms-cm.

EXAMPLE 23

A blend was obtained by mixing polypropylene resin as a base film resin with 9% by volume of carbon black and melt extruded to give pellets in which carbon black was dispersed uniformly in the polypropylene resin.

Using the polypropylene resin as a dielectric layer resin, the resin was laminated on the both surfaces of a core layer comprising the aforesaid base film resin. The laminated film was concurrently extruded at a temperature of 250° C. and then oriented in the lengthwise direction under orientation conditions as shown in Table 3 below. The thicknesses of the base film and the dielectric layers are shown in Table 3 below provided that the thicknesses of the both dielectric layers were identical to each other.

COMPARATIVE EXAMPLES 20-21

Each of the base film resin and the dielectric layer resin as used in Example 23 was extruded at a temperature of 250° C. and oriented 7.5 times its original length at a temperature of 135° C.

On the both surfaces of the resulting film was deposited an aluminum layer as an electrode, and the resulting film was measured for its specific dielectric constant, tan δ and volume intrinsic resistivity after 1 minute when a direct current of 100 volts was applied. The results are shown in Table 3 below.

mation such as a roll capacitor requires flexibility; otherwise breakdown is caused upon molding. As have been set forth hereinabove, flexibility becomes an important property, and the dielectric film according to the present invention can be used for these purposes.

The composite film in accordance with the present invention possesses greatly improved volume intrinsic resistivity and tan δ when compared to one resulting from a thermoplastic resin containing conductive fine powders. The dielectric constant and the electrostatic capacity per unit area of the composite film according to the present invention are improved to a remarkable extent as compared by the corresponding dielectric layer alone. Accordingly, the composite film in accordance with the present invention may be particularly suitable for film capacitors and the like.

As have been set forth hereinabove, one embodiment in accordance with the present invention comprises the base film comprising the thermoplastic resin containing the conductive fine particles provided at least one surface thereof with the dielectric layer comprising the thermoplastic resin. Accordingly, the present invention can greatly improve an electrostatic capacity per unit surface area with a thickness which provides a favorable processability for manufacture.

What is claimed is:

1. A dielectric film comprising from about 40 to 97% by volume of a thermoplastic resin, from about 2 to 50% by volume of a ceramic dielectric and from about 1 to 25% by volume of carbon black.

2. The dielectric film in accordance with claim 1 wherein the thermoplastic resin is in the amount ranging from about 45 to 95% by volume.

3. The dielectric film in accordance with claim 2

TABLE 3

| | Drawing Temp (°C.) | Drawing Rate (times) | Thickness of Base Film (μ) | Thickness of Dielectric Layer (μ) | Relative Dielectric Constant | tan δ | Volume Resistivity (ohm-cm) | Electrostatic Capacity per Unit Surface Area (μF/sq.m.) |
|---|---|---|---|---|---|---|---|---|
| Example 23-1 | 135 | 7.5 | 25 | 2.5 | 17 | 0.0007 | $2.6 \times 10^{16}$ | 5.0 |
| Example 23-2 | 135 | 7.5 | 12 | 2.5 | 10.5 | 0.0007 | $3.7 \times 10^{16}$ | 5.5 |
| Comparative Example 20 | 135 | 7.5 | 17 | — | 15,000 | 0.18 | Inmeasurable | 7,800 |
| Comparative Example 21 | 135 | 7.5 | — | 17 | 2.3 | 0.0006 | $2.5 \times 10^{17}$ | 1.2 |

EXAMPLE 24

A uniaxially oriented film was prepared in the same procedures as in Example 21-3 with the exception that the base film resin and the dielectric layer resin of Example 34-3 were concurrently extruded so as to provide 0.5 mm wide portions having no carbon black at a distance of 10 mm in the widthwise direction. The relative dielectric constant, tan δ and volume resistivity of the resulting film were respectively 40, 0.02 and $1.8 \times 10^{14}$ ohms-cm. The resistivity was higher than $10^{15}$ ohms at a width of 40 mm and a length of 40 mm, while that of the portions containing no carbon black was 380 kiloohms.

As have been known from the foregoing examples, the dielectric film in accordance with the present invention can possess flexibility by choosing the composition and kind of raw materials appropriately. For example, where a large area is required such as an electric wave absorber or where an electrostatic capacitive switch is subject to a stress whenever it is applied giving rise to a transformation, a flexibility is required for the prevention from breakdown. A film which is used by transforwherein the thermoplastic resin is in the amount ranging from 50 to 93% by volume.

4. The dielectric film in accordance with any one of claims 1 to 3 wherein the thermoplastic resin is a nonpolar thermoplastic resin or a polar thermoplastic resin.

5. The dielectric film in accordance with claim 4 wherein the non-polar thermoplastic resin is polyethylene or polypropylene.

6. The dielectric film in accordance with claim 4 wherein the polar thermoplastic resin is a polyvinylidene fluoride homopolymer or a polyvinylidene fluoride copolymer obtainable by the copolymerization of more than about 50 mol% of vinylidene fluoride with a fluorine-containing compound.

7. The dielectric film in accordance with claim 6 wherein the polar thermoplastic resin is one having a relative dielectric constant at 1 KHz is larger than about 6.

8. The dielectric film in accordance with claim 7 wherein the relative dielectric constant at 1 KHz is larger than about 8.

9. The dielectric film in accordance with claim 1 wherein the ceramic dielectric is in the range from 5 to 45% by volume.

10. The dielectric film in accordance with claim 9 wherein the ceramic dielectric is in the range from 10 to 40% by volume.

11. The dielectric film in accordance with any one of claims 1, 9 and 10 wherein the ceramic dielectric is a ferroelectric or a ceramic paraelectric material.

12. The dielectric film in accordance with claim 11 wherein the ferroelectric is a ceramic of the $BaTiO_3$ type, of the lead titanozirconate type or of the niobic acid type.

13. The dielectric film in accordance with claim 12 wherein the paraelectric is $BaTiO_3$.

14. The dielectric film in accordance with claim 11 wherein the ceramic is titanium oxide.

15. The dielectric film in accordance with claim 1 wherein carbon black is in the range from 2 to 20% by volume.

16. The dielectric film in accordance with claim 15 wherein carbon black is in the amount ranging from about 3 to 15% by weight.

17. A composite film comprising a base film comprising from about 40 to 97% by volume of a thermoplastic resin, from about 2 to 50% by volume of a ceramic dielectric and from about 1 to 25% by volume of carbon black and a dielectric layer comprising a thermoplastic resin having a volume resistivity lower than that of the base film, said dielectric layer being disposed on at least one surface of said base film.

18. The composite film in accordance with claim 17 wherein the composite film is laminated by means of coextrusion.

19. The composite film in accordance with claim 17 wherein the laminated composite film is prepared by means of coextrusion and subjected to stretching or drafting.

20. The composite film in accordance with any one of claims 17 or 19 wherein the base film is provided with a linear portion of the thermoplastic resin that contains no carbon black.

21. The composite film in accordance with claim 17 wherein the base film is laminated with the dielectric layer without interposition of an adhesive layer.

22. The composite film in accordance with claim 17 wherein a relative dielectric constant of said dielectric layer is higher than 10.

23. The composite film in accordance with claim 17 wherein a thickness of said dielectric layer is less than 5 microns.

24. The composite film in accordance with claim 23 wherein the thickness of said dielectric layer is less than 3 microns.

25. The composite film in accordance with claim 23 wherein the thickness of said dielectric layer is less than 2 times the thickness of said base film.

26. The composite film in accordance with claim 25 wherein the thickness of said dielectric layer is equal to or thinner than the thickness of said base film.

27. The composite film in accordance with claim 25 wherein the thickness of said dielectric layer is from $\frac{1}{2}$ to 1/50 with respect to the thickness of said base film.

28. The composite film in accordance with claim 17 wherein the thermoplastic resin constituting said dielectric layer and said base film is a polyvinylidene fluoride.

29. The composite film in accordance with claim 17 wherein said dielectric layer comprises the thermoplastic resin in which the ceramic dielectric is dispersed.

30. A process for preparing a composite film which comprises the steps of coextruding a base film and a dielectric layer with one disposed on the other into a sheet and drawing the resulting film in a uniaxial or biaxial direction.

* * * * *